Patented Oct. 24, 1939

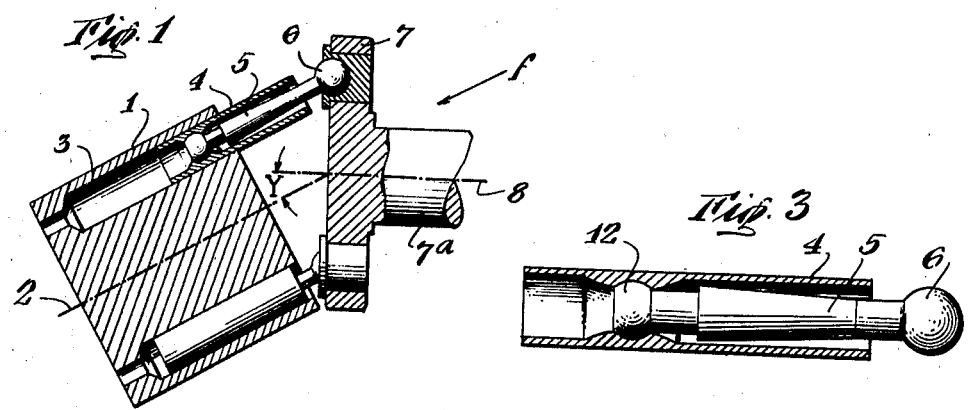
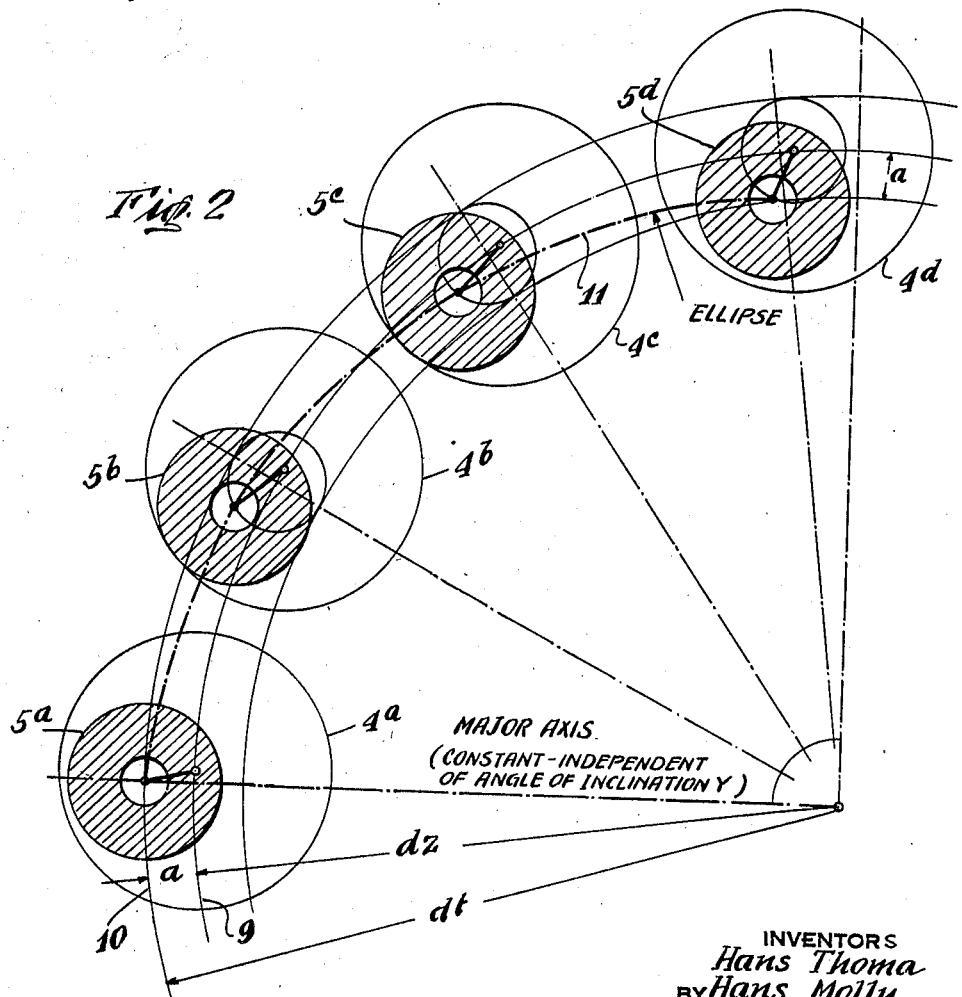

2,177,613

UNITED STATES PATENT OFFICE 2,177,613

HYDRAULIC DEVICE

Hans Thoma, Karlsruhe-Baden, and Hans Molly, Berlin, Germany

Application December 1, 1938, Serial No. 243,396
In Germany December 8, 1937

9 Claims. (Cl. 74—63)

This invention relates to improvements in hydraulic devices and has for an object to improve and simplify the construction of positive displacement hydraulic devices, particularly of the infinitely variable volume type.

In such devices, pistons operate in cylinder bores in a cylinder block, said pistons being operated by a driving flange through piston rods connected thereto and to said pistons. The cylinder block is mounted for rotation about its axis, which axis is inclined relative to the axis of rotation of the driving flange or disk. The inclination may be changed in order to vary the volume displaced by the device per revolution. The known devices of this type are usually provided with a universal joint which serves to connect the cylinder block with the driving flange for rotation.

It is an object of the invention to provide a construction in which such a universal joint may be omitted and thereby the construction of the drive very greatly simplified. Furthermore, the number of cylinders may be greatly reduced as the space near the axis heretofore needed for the universal joint is no longer necessary. It is an object of the invention to have the piston rods themselves serve to communicate rotary movement of the cylinder block relative to the driving flange, this being accomplished by limiting the movement between the pistons and the piston rods to the least which is necessary to satisfy the kinematic requirements. Therefore, the additional play necessary for assembly purposes should be kept as small as possible. The smaller this supplemental play, the less the lag of the one member relative to the other, whereby the objectionable effect of such a lag is reduced.

In order to reduce the forces and shocks upon the parts, it is desirable that the piston rods and the inner walls of the pistons be so constructed that the piston rods come into contact with the pistons at a plurality of points (preferably a generated surface of contact). Thus, for example, if the inner surface of the piston is cylindrical the co-acting surface of the connecting rod is preferably conical.

It is another object of the invention to so proportion the various parts of such devices including the internal form of the pistons and the external form of the piston rods, that when the device is adjusted to its greatest angle of inclination, as between the axis of the cylinder block and the axis of the driving flange, the piston rods do not bear against the piston walls radially with respect to the cylinder block when the respective pistons are at or near either end of their strokes but that the contact between the piston rods and the inner walls of their respective pistons can only occur in a direction substantially circumferential with respect to the cylinder block.

Another object is to utilize the construction described in that type of device in which only very little torque must be transmitted as between the flange and the cylinder, such as where the driving torque is applied directly to the driving flange. It is only by thus applying the driving torque to the driving flange that the universal joint may be supplanted by the construction in which the piston rods bear against and carry along the pistons and therefore the cylinder block.

Other objects will appear from the following description of an illustrative embodiment of the invention taken together with the attached drawing wherein:

Fig. 1 illustrates schematically such a device in a cross-sectional view on the plane which includes the axes of the cylinder block and the driving flange;

Fig. 2 is a diagram showing the relationship of the piston rods to the inner walls of the pistons in various positions of rotation; and Fig. 3 shows an enlarged view of the details of construction of a form of piston and piston rod which may be utilized.

Referring to Fig. 1, the cylinder block 1, which is rotatable upon axis 2 is provided with a plurality of cylinder bores 3 concentric with the axis 2. In each bore a piston 4 is located, whose piston rod 5 is connected at its outer end with the driving flange 7 by means of a spherical joint 6. The axis of rotation 8 of the driving flange 7 is inclined through the angle $y$ relative to the cylinder block axis 2. This angle of inclination can be changed for varying the delivery volume per revolution, as by swinging the cylinder block relative to the shaft 7a.

In accordance with the invention, the device is so constructed that the universal joint heretofore usually used between the drive flange 7 and the cylinder block 1 is eliminated and that the piston rods 5 themselves serve that purpose.

An exact study of the kinematic conditions, as per Fig. 2, makes clear why the above mentioned relations are desirable for a satisfactory drive without universal joint. Fig. 2 is a view in the direction of the arrow X, Fig. 1, upon one-quarter of the cylinder block 1. The cylinder block shown is provided with thirteen cylinder bores so that upon the quarter shown approximately four pistons 4a, 4b, 4c, 4d, appear and within said pistons the cooperating piston rods 5a, 5b, 5c, 5d, respectively. Centers of the circles 4a and 4b lie upon the cylinder circle 9 with the diameters $dz$. The center of the sphere 6 (Fig. 1) lies on the so-called driving circle 10 having a diameter $dt$. Viewed in the direction of the arrow X, the driving circle 10 appears as the ellipse 11 whose two half axes are $$0.5\ dz - a\ \text{and}\ 0.5\ dz + a$$

so that between the driving circle diameter and the cylinder circle diameter, the following relationship exists:

$$dt\ \text{equals}\ dz\ \text{plus}\ 2a$$

During the rotation of the device, the piston rods 5 travel along the ellipse 11, as is obvious from Fig. 2. Thereby, the piston rods are given a circular movement within the pistons at a radius $a$ about the piston axis, as is clear from the drawing. It is desirable to reduce the supplemental play between the piston and the piston rod to as nearly zero as possible. For practical reasons, as, for example, errors in construction, it is however generally necessary to provide a small supplemental play in order to compensate for such errors. This play may be reduced through choice of dimensions of piston and piston rod as by adjusting the thickness of the piston rods (the circles 5a, 5b, 5c, 5d). During the rotation of the drive flange 7, the cylinder block lags just so much that the piston rods 5b and 5c may contact, that is those piston rods which are in position for that purpose, it being noted that the contact is at such a point that the forces exerted are substantially circumferential of the cylinder block and not radial.

The other piston rods 5a and 5d have at this time no contact with their pistons, as appears from Fig. 2. Therefore, it is clear that the supplemental play produces a non-uniform drive and therefore produces uneven speed of the cylinder block.

The supplemental play requires further that the cylinder block lag behind the driving flange and therefore that all of the piston rods are so inclined relative to the cylinder block that they produce a reverse torque. This torque creates a substantial additional stress between the pistons and the piston rods. It is therefore desirable to keep the supplemental play as small as possible and therefore errors in construction and assembly are to be avoided to the fullest extent.

With reference to Fig. 2, it is possible to easily determine the conditions which result in reducing the freedom of movement of the piston rod in the piston to the smallest possible extent. As stated above, it is assumed that with the greatest angular increase $y$ (Fig. 1) the ellipse 11 corresponding to the driving circle $dt$ varies from the cylinder circle 9 by the distance $a$. Under these conditions, the piston rods make the minimum angular movement in the piston since, for example, with a smaller driving circle diameter $dt$ the ellipse will recede further from the cylinder circle 9 at the smaller axis of the ellipse than at the larger axis. Therefore, the plan would, in these cases, be divided unsymmetrically and as a result thereof the piston rods must be dimensioned according to the greatest angle of inclination.

Since the value $a$ is dependent upon the angle $y$, the relationships between the two diameters $dt$ and $dz$ will be affected by the angle of inclination $y$. The following relationship exists:

$$dt\ \text{equals}\ dz\ \text{times}\ \frac{2}{1\ \text{plus}\ \cos y}$$

In this connection the circumstance is interesting that the least possible movement of the piston rod in the piston is independent of the number of pistons, that is, that the required conditions can be satisfied and in spite thereof the designer has a free hand in the choice of the number of pistons and the data resulting therefrom.

It will be further noted from Fig. 2 that the piston rods 5 do not make contact with the inner walls of the pistons except in a direction which is substantially circumferential with respect to the cylinder block. Therefore, the forces existing between the piston rods and the pistons are little, if any greater than those required for holding the cylinder block in synchronism with the driving flange.

Fig. 3 shows a form of construction in which the piston rod 5 of conical form cooperates with a piston having cylindrical inner walls, said rod being of such conical conformation that upon oscillation relative to the piston, a substantial portion thereof lies in contact with the piston. According to the form of construction of Fig. 3, in which the piston is formed of tubing whose inner diameter is equal to that of the diameter of the sphere 12, the balls 12 and the cone of the piston rod 5 are so positioned that the generatrix of the cone is tangent with the sphere 12. In this manner the construction of the device in accordance with the invention can be simplified.

It will be noted that the constructions shown and described will serve admirably to accomplish the objects stated above. It is to be understood, however, that the constructions disclosed above are intended merely as illustrative of the invention and not as limiting as various modifications therein may be made without departing from the invention as defined by a proper interpretation of the claims which follow.

I claim:

1. In a positive displacement hydraulic device of the piston type, a cylinder block formed with a plurality of cylinder bores generally parallel to the axis of said block, means for supporting said block for rotation about its axis, a driving flange mounted for rotation about its axis, said mountings being so arranged as to allow variation of inclination of one of said axes relative to the other, pistons in said cylinder bores, piston rods, one for each of said pistons, a universal joint connecting means for connecting one end of each piston rod to its respective piston, and a universal joint connecting means for connecting the other ends of said piston rods to said driving flange, the external form of said piston rods and the internal form of said pistons being such that during a portion of the revolution of said cylinder block and driving flange one or more of the piston rods will bear against the inner walls of their respective pistons and thereby cause said cylinder block and driving flange to rotate in synchronism.

2. A device in accordance with claim 1 in which the freedom of movement between the pistons and the piston rods is the minimum permitted by the kinematic requirements of the device whereby a minimum lag as between the cylinder block and the driving flange is achieved.

3. A device according to claim 1 wherein the drive flange diameter $dt$ at the greatest inclination $y$ has about the same value as the product of the factors 2 times $(1+y)$ and the cylinder diameter $d_z$.

4. A piston device according to claim 1 wherein the piston rod and the inner walls of the pistons have such a form relative to each other that the piston rod upon contact with the piston wall engages along a line preferably the generatrix of the outer surface of the piston rod.

5. A device according to claim 1 wherein the inner wall of the pistons are cylindrical and the piston rods are conical.

6. A device according to claim 1 wherein the piston rod is formed with a spherical enlargement sealed in a spherical recess within the piston and that portion of the piston rod which may contact the inner walls of the piston is formed as a cone, the generatrix of which is tangent with said ball.

7. In a positive displacement hydraulic device of the piston type, a cylinder block formed with a plurality of cylinder bores generally parallel to the axis of said block, means for supporting said block for rotation about its axis, a driving flange mounted for rotation about its axis, said driving flange having a direct driving connection with an external device for driving said device or for being driven thereby, said mountings being so arranged as to allow variation of inclination of one of said axes relative to the other, pistons in said cylinder bores, piston rods, one for each of said pistons, a universal joint connecting means for connecting one end of each piston rod to its respective piston, and a universal joint connecting means for connecting the other ends of said piston rods to said driving flange, the external form of said piston rods and the internal form of said pistons being such that during a portion of the revolution of said cylinder block and driving flange one or more of the piston rods will bear against the inner walls of their respective pistons and thereby cause said cylinder block and driving flange to rotate in synchronism.

8. A device in accordance with claim 1 in which the pistons and the piston rods are so formed and arranged that the rods can bear against the inner walls of their pistons only in a direction generally circumferential with respect to the cylinder block.

9. In a positive displacement hydraulic device of the piston type, a cylinder block formed with a plurality of cylinder bores generally parallel to the axis of said block, means for supporting said block for rotation about its axis, a driving flange mounted for rotation about its axis, said driving flange having a direct driving connection with an external device for driving said device or for being driven thereby, said mountings being so arranged as to allow variation of inclination of one of said axes relative to the other, pistons in said cylinder bores, piston rods, one for each of said pistons, a universal joint connecting means for connecting one end of each piston rod to its respective piston, and a universal joint connecting means for connecting the other ends of said piston rods to said driving flange, the external form of said piston rods and the internal form of said pistons being such that during a portion of the revolution of said cylinder block and driving flange one or more of the piston rods will bear against the inner walls of their respective pistons in a direction substantially circumferential with respect to the cylinder block and thereby cause said cylinder block and driving flange to rotate in synchronism.

HANS THOMA.
HANS MOLLY.